Dec. 3, 1929.   J. WEINBERGER   1,738,337
METHOD OF AND ARRANGEMENT FOR STRAY ELIMINATION IN RADIO COMMUNICATION
Filed Aug. 17, 1923
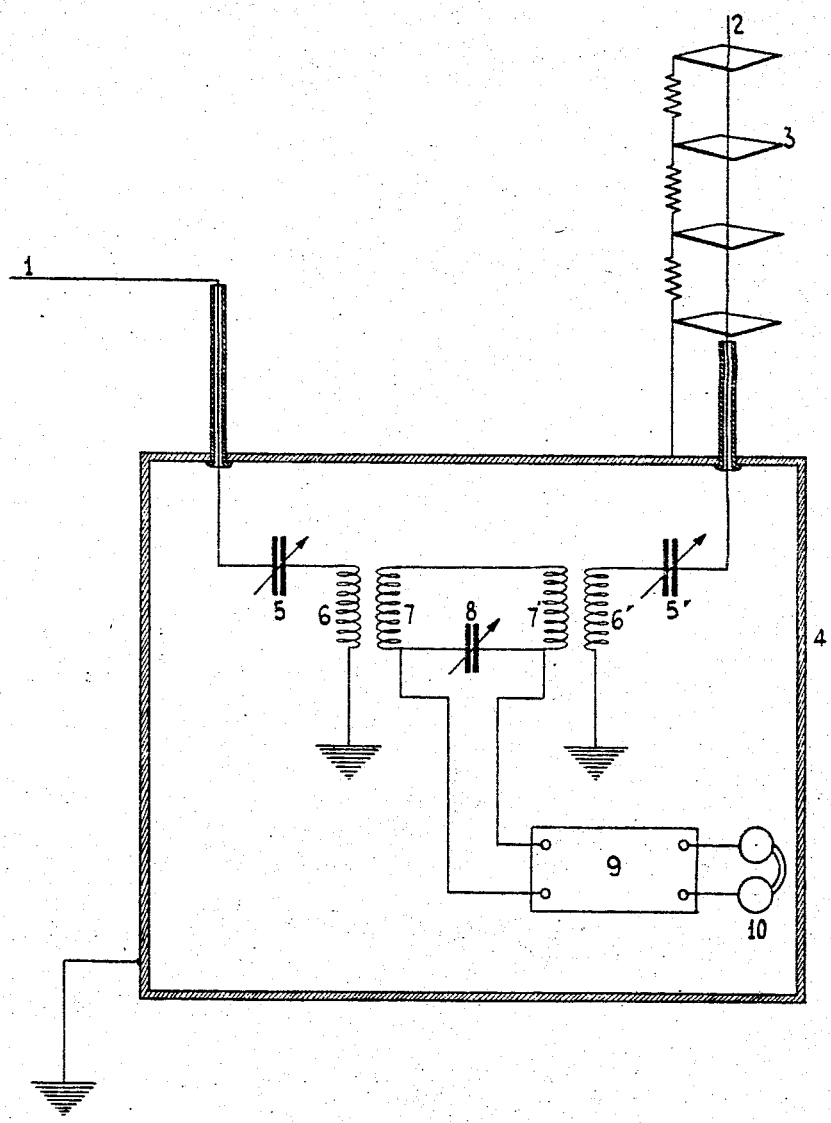
Inventor
JULIUS WEINBERGER
By his Attorney
Ira J Adams Patented Dec. 3, 1929

1,738,337

UNITED STATES PATENT OFFICE

JULIUS WEINBERGER, OF NEW YORK, N. Y., ASSIGNOR TO RADIO CORPORATION OF AMERICA, A CORPORATION OF DELAWARE

METHOD OF AND ARRANGEMENT FOR STRAY ELIMINATION IN RADIOCOMMUNICATION

Application filed August 17, 1923. Serial No. 657,861.

The object of this invention is to provide a system of antennæ (or collectors, as they will hereafter be called) and associated circuits, which may be utilized to take advantage of the differences in the type of field due to strays and that due to the electromagnetic waves employed in radio communication.

In a copending application Serial No. 657,860 filed of even date herewith, I have described a system in which strays possessing only electric fields may be eliminated. In this same application I have also described my theory of the method whereby voltages are induced in the ordinary types of wave collectors. It was brought out therein that a "condenser antenna", or a low horizontal wire, with vertical leads shielded, responds only to electric fields; while the ordinary type of vertical antenna responds to both magnetic and electric fields in equal measure. On this assumption a system of reception was developed which responded only to magnetic fields; and it was found, experimentally, that a considerable quantity of the strays were eliminated by this system, proving that these strays were predominantly electric fields.

In the present application, these basic principles are further extended to include the elimination of strays having either electric or magnetic fields; since it was found by experiment that certain strays of the so-called "click" type were still heard in the above mentioned "magnetic field receiving system", proving that these strays were magnetic in nature.

In order to understand the system to be described, several points must be kept clearly in mind, viz:

1. In an electromagnetic signal wave, the magnetic and electric fields are in phase and equal in magnitude.

2. In strays, I believe that any magnetic fields which exist are mainly due to rapidly changing electric fields near the receiving collector; hence the magnitude of these magnetic fields is dependent on the rate of change of the electric field producing it, and the magnetic field may be regarded as 90 degrees out of phase with the electric field producing it, if this is periodic in nature. Even if it is not periodic, there is a 90° phase difference between the oscillatory currents produced in a tuned receiving system by the electric field of a stray, and those produced by the magnetic field due to the rate of change of this same stray. In other words, the fields of a stray, (electric and magnetic), are those of a local, stationary field, while the fields of the signalling waves are those of a travelling wave.

The foregoing facts may be taken advantage of in eliminating strays, by the system shown in the diagram of the figure.

Here, 1 is a collector for electric fields, that is, a condenser antenna or horizontal wire with its vertical portions shielded.

2 is a collector for magnetic fields in the form of a vertical antenna surrounded by a so-called "Dieckmann" or Faraday cage. The latter consists of squares or loops of wire, 3, placed at intervals of a few feet along the antenna and surrounding it, all being connected together aperiodically and to ground. This arrangement prevents electric fields from reaching the antenna, but magnetic fields pass thru it readily. It has been described by M. Dieckmann, in "Luftfahrt und Wissenschaft", volume 1, 1912. An important advantage of this type of antenna is that it is non-directional.

These antennæ may not be perfect in responding solely to the electric or magnetic fields respectively. Undoubtedly, as the art progresses, they will be made more nearly so. In the appended claims the terms which imply that antenna 1 collects energy only from the electric field, and that antenna 2 collects energy only from the magnetic field, are to be construed with some latitude, the idea being that they are designed and intended to act as described as nearly as is practicable.

4 is a shielded building, housing the remainder of the apparatus, with shielded leading-in conduits for the collectors.

5, 5', are variable condensers and 6, 6', inductances for tuning each of the collectors.

7, 7', are inductances coupled to 6, 6' in such fashion that voltages generated in them by currents thru 6, 6' which are in phase will balance out.

8 is a variable condenser for tuning to the desired signals with inductances 7, 7'.

9 is a detecting and amplifying system connected to circuit 7, 8, 7', by means of which signals may be heard in the telephones 10.

The principle of operation of the system is as follows:

In collector 1, the electric fields of signals and strays cause currents to flow thru coil 6. These currents generate magnetic fields in this coil. The magnetic field of the coil due to the signal is 90° out of phase with the signal wave electric field; the magnetic field of the coil due to the stray is also 90° out of phase with the stray's electric field.

In collector 2, the magnetic fields of signals and strays also cause currents to flow thru its coil 6', and magnetic fields are also generated in this coil by these currents. The magnetic field of the coil due to the signal magnetic field is 180° out of phase with the latter, and therefore 90° out of phase with the magnetic field simultaneously being produced by the signal in coil 6 of collector 1. The magnetic field of the coil 6' of the antenna 2, produced by currents due to the magnetic field of strays is similarly 180° out of phase with the latter, but is in phase with the magnetic field being produced simultaneously in coil 6 of antenna 1 by currents due to the electric fields of these same strays. These stray fields then balance out in circuit 7, 8, 7' leaving only signal currents.

In other words, what I have done is to produce currents in collector 2 by the magnetic field of the strays, which is a consequence of a changing electric field and then reproduce this same magnetic field as a field in coil 6 of collector 1 resulting from the rate of change of the electric field affecting collector 1.

The arrangement shown is only one method whereby advantage may be taken of the principles outlined, and other methods may be devised which will still be within the spirit of the invention as claimed in the appended claims.

Having described my invention what I claim is as follows:—

1. A method of stray elimination which consists in transforming the electric fields of signals and strays into magnetic fields, neutralizing the magnetic field produced by the electric field of the strays by a magnetic field produced by the magnetic field of the strays, and detecting the magnetic field produced by the electric field of the signals.

2. A method of stray elimination which consists in transforming the electric fields of signals and strays into magnetic fields, neutralizing the magnetic field produced by the electric field of the strays by a magnetic field produced by the magnetic field of the strays, transforming the magnetic field of the signals into another magnetic field, and detecting the magnetic field produced by the electric and magnetic fields of the signals.

3. In combination, a collector of magnetic fields alone consisting of an antenna surrounded by a Faraday cage, a collector of electric fields alone, tuning means, means for detecting high frequency currents, and means for preventing responses to strays in the detecting system by causing current from strays in one collector to be balanced by current from strays in the other collector.

4. In combination, a condenser antenna, a non-directional vertical antenna surrounded by means for shielding the latter from electric fields, said antennæ being tuned to the same frequency, a detecting system for electrical currents, and means for obtaining in the detecting system a response due to currents flowing in both antennæ.

5. In combination, a horizontal antenna, a vertical antenna enclosed in a grounded cage, said antennæ being tuned to the same frequency, a single radio signalling apparatus, and means for coupling both said antennæ to said radio signalling apparatus.

6. In combination, a horizontal antenna having a vertical lead, a grounded shield for the lead, a vertical antenna shielded by a grounded cage and shield, coupling means for the antennæ enclosed in a shielded space, and communication means responsive to energy in the coupling means.

7. In combination, an antenna responsive solely to an electric field, an antenna shielded by a Faraday cage, a receiver, and means to couple the antennæ to one another and to the receiver.

8. In combination, a grounded shield, coupling means within the shield, antennæ, connections within the shield to said antennæ, said antennæ being disposed outside of said shield, one of said antennæ being horizontal, and the other of said antennæ being surrounded by a grounded cage.

9. The method of neutralizing a stray composed of a varying electric field accompanied by an out-of-phase magnetic field which consists in transforming energy solely from the stray's electric field into a local magnetic field, simultaneously transforming energy solely from the stray's magnetic field into a local magnetic field, and so adding the effects of the local magnetic fields that they neutralize one another.

10. The method of eliminating strays without eliminating signals in a region where the electric and magnetic components of the stray are out-of-phase and the electric and magnetic components of the radiated signal wave are in phase which consists in so combining an effect caused solely by the electric components with an effect caused solely by the magnetic components that the phase relation of the effects of the electric and magnetic components of the stray are in opposition, wherewith the phase relation of the effects of the electric and magnetic components of the signal necessarily are not in opposition, and utilizing the unneutralized effect of the signal for communication.

JULIUS WEINBERGER.